July 25, 1967 L. E. G. GEOFFROI 3,333,047

ELECTRICAL CONNECTOR WITH PRE-PLACED SOLDER

Original Filed Jan. 10, 1963

INVENTOR.
LOUIS EMIL GERARD GEOFFROI
BY
Brown, Schuyler & Beveridge
ATTORNEYS.

United States Patent Office 3,333,047

Patented July 25, 1967

3,333,047

ELECTRICAL CONNECTOR WITH PRE-PLACED SOLDER

Louis Emil Gerard Geoffroi, 56 William St., Garson, Ontario, Canada

Continuation of application Ser. No. 250,671, Jan. 10, 1963. This application Jan. 13, 1965, Ser. No. 427,536
2 Claims. (Cl. 174—94)

This application is a continuation of my application No. 250,671, filed Jan. 10, 1963, now abandoned, entitled "Preformed Wire Connector," which was a continuation-in-part of my application No. 23,430, filed Apr. 20, 1960, now abandoned, also entitled, "Preformed Wire Connector," and relates to improved connectors for use in the fabrication and repair of electrical circuits.

In the fabrication and repair of electrical circuits, particularly of the type involved in electronic work, such as radio circuits, TV circuits, radar circuits, etc., both of the "wired chassis," and "printed circuit" variety, a principal concern to the technician is the application to and removal of solder from permanent joints. The handling of solder in these situations requires considerable skill. For instance, an application of excessive solder may cause dripping onto adjacent wiring and subsequent short circuiting, while too little solder may result in an inoperative connection. This is particularly true where printed circuits are involved.

Normally when such solder joints are made, it is necessary to first make a strong mechanical connection of the wires. This involves bending and crimping of wires and in the cramped areas of electronic instruments considerable skill and patience on the part of the technician is often required in so doing.

A proposed solution to these problems has been the provision of short tubular connectors having a premeasured quantity of solder associated therewith. In using these connectors, the wires to be joined would each be inserted in opposite ends of the connector, and upon the application of heat to the solder supply, a permanent joint would be effected.

While these connectors offered a solution to the problems, they also offered several attendant disadvantages. Very often their structure was so complex as to make the cost of manufacture prohibitive. In others, the solder supply was so located that during the period of its liquification, the structural strength of the connection was weakened. In yet others, it was impractical to manufacture them except in predetermined lengths which could not be changed without distorting the connector.

It is therefore an object of my invention to provide a preformed wire connector which has relatively few component parts, affords mechanical strength to the joint independently of the state of its solder supply, and is manufactured in a form wherein suitable length connectors may be removed readily and without distortion.

It is a further object of my invention to provide connectors of the type described which may be stored and handled in a manner which adds to the convenience of their utilization.

It is a still further object of my invention to provide connectors of the type described having a premeasured quantity of solder intimately associated therewith.

It is another object of my invention to provide connectors of the type described wherein the solder is associated with the connector in a manner which permits ready flow of the solder both to the connector and to the fabricated joint.

The foregoing and other objects are achieved by a helically wound connector having spaced turns formed of a tinned conductor wire with a solder layer surrounding the wire. In the preferred embodiment of this invention, the outer surface of the connector is knurled to first provide a closer adhesion of the solder to the wire, and secondly to provide a roughened surface which permits ease of handling.

Other objects and features of the invention will become apparent by reference to the following specification and to the drawing.

Figure 1:
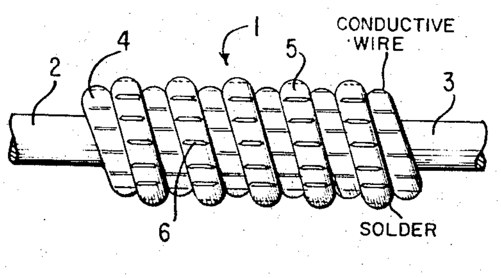
FIG. 1 shows a connector according to my invention in its preferred embodiment.
Figure 2:
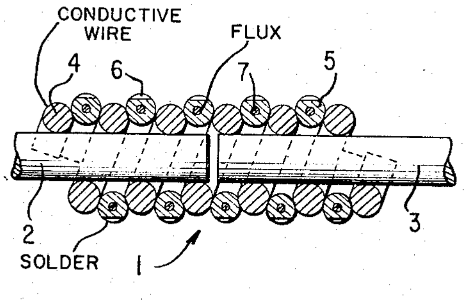
FIG. 2 is a longitudinal section of FIG. 1 showing the disposition of the wires to be joined as well as the relationship of the solder ribbon to the conductor wire.

Referring now to FIGS. 1 and 2, the connector 1 is shown joining wires 2 and 3. The connector has as its basic structure a helically wound conductor wire 4. The wire 4 is wound in a fashion such that spaces exist between each adjacent turn. Disposed in these spaces is the helically wound solder ribbon 5. While it is preferred that the solder ribbon 5 be of approximately the same diameter as that of the conductor wire 4, this proportion may vary according to the particular needs of the situation, the spacing between the conductor wire helices being adjusted accordingly. The spacing of the turns of the wire 4 should be chosen to be slightly less than the diameter of the solder ribbon. The exterior surface of the connector is knurled, as at 6.

The solder used in the fabrication of the connector may be of that type having a resin core, as shown at 7, or the resin may be separately applied, as by spraying, painting or dipping.

Figure 7:
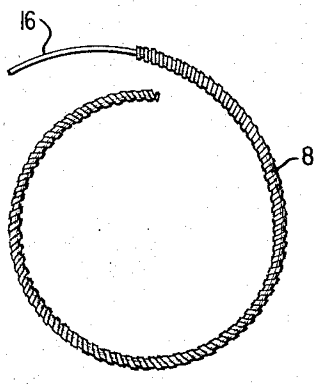
FIG. 7 shows the connector disposed in a loop prior to removal of individual segments.

The spacing of the conductor wire helices is important for several reasons. When the connector wire is to be dispensed from a single length source 8, as shown in FIG. 7, it is necessary that the segments of the length desired be removed without distorting the interior dimensions of the connector. If the connector is distorted, then oftentimes it will be impossible to insert the wires to be connected therein. Because of the small dimensions of the connector, to attempt to reshape it would take more time than would be practical. To alleviate this problem, the peculiar shape of my connector is such that segments may be removed by cutting at a single point without distorting the connector. Segments may be removed with such instruments as a set of wire cutters, or a wire stripper. The spacing of the helices permits the insertion of the blades of these instruments between the turns, the only resistance offered by other than the conductor itself being the relatively soft strand of solder.

The knurling 6 of the connector accomplishes two purposes. The action of the knurling tool tends to press the solder more firmly between the turns of the conductor wire. This produces a connector having a certain structural strength and which will not readily ravel. A second result is the facilitation of handling which the roughened surface permits.

Figure 3:
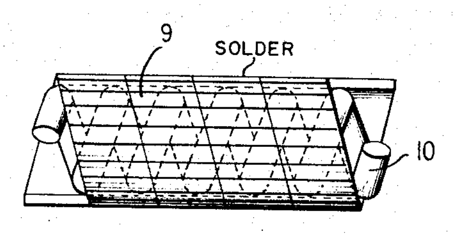
FIG. 3 shows an alternative embodiment of my invention wherein the solder is in the form of a flat ribbon wrapper around the outside of the conductor wire.
Figure 4:
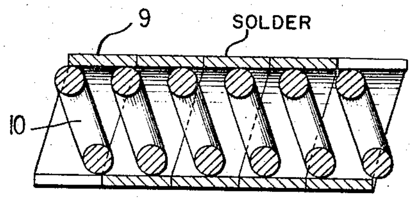
FIG. 4 is a longitudinal section of the connector of FIG. 3 showing the disposition of the wire therein.

FIGS. 3 and 4 show a first alternative embodiment of my invention. In this case, the solder 9 is in the form of a flat ribbon wound around the conductor wire 10.

Figure 5:
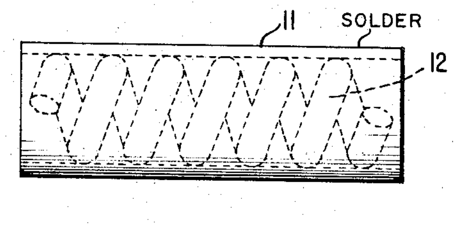
FIG. 5 is another alternative embodiment of my invention wherein the solder is in the form of a sleeving surrounding the conductor wire.

A second alternative embodiment is shown in FIG. 5, where the solder is in the form of a cylindrical sleeve 11 which is slipped over the conductor 12. In this case, connector segments may still be removed from a single length. While there would be a certain distortion of the solder sleeve, it would be minimized by the internal support afforded by the conductor helix. Moreover, because of the softness of the solder, any distortion of it could be restored without appreciable effort.

When the connector is to be used, the wires to be joined are inserted into either one or both ends of the connector. While FIG. 2 shows the wires in an abutting relationship, a lap joint may also be used, depending upon the diameters of the connectors and the wires. After the wires have been inserted, heat is then applied to liquefy the solder and fuse the joint. During this time, the strength of the joint is not impaired since the solid solder did not contribute to it. In addition, because of the spacing of the turns, the flow of the solder to the connected wires is not impeded.

Figure 6:
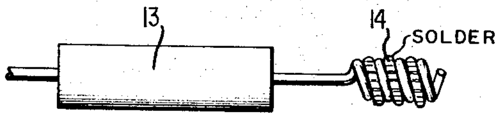
FIG. 6 shows an electrical component having a lead manufactured in the form of a connector according to my invention.

FIG. 6 shows an electrical component 13 having one of its leads preformed into a connector of the type shown in FIG. 1. It should be apparent that the connector forms shown in FIGS. 3–5 would also be suitable.

FIG. 7 shows a length 8 of a connector of the type described strung on a dispensing wire 16. The wire provides support for the connector during storage, and also acts as an anvil for the cutting tool in the removal of individual segments.

While I have disclosed several embodiments of my invention, these are to be considered as exemplary rather than as limiting and I include as my invention all modifications which would be apparent to those skilled in the art.

I claim:

1. For use in the fabrication and repair of electrical circuits, a preformed tubular connector comprising a helical winding defining the peripheral walls of a tubular passage, the adjacent turns of said winding being spaced, and a ribbon of solder wound around said winding and positioned in the spaces between said adjacent turns of said winding, the external surface of at least said ribbon solder being knurled.

2. For use in the fabrication and repair of electrical circuits, a preformed tubular connector comprising a helical winding defining the peripheral walls of a tubular passage, the adjacent turns of said winding being spaced, and a ribbon of solder wound around said winding and positioned in the spaces between said adjacent turns of said winding, the external surface of at least said solder ribbon being roughened.

References Cited

UNITED STATES PATENTS

| | | | |
|---|---|---|---|
| 294,549 | 3/1884 | Waring. | |
| 1,694,360 | 1/1929 | Day | 228—56 |
| 2,664,844 | 1/1954 | Siegrist et al. | 228—56 |
| 3,089,223 | 5/1963 | Walker | 174—94 X |
| 3,274,331 | 9/1966 | Quigley | 174—94 |

LEWIS H. MEYERS, *Primary Examiner.*

JOHN F. BURNS, DARRELL L. CLAY, *Examiners.*